United States Patent
Kraemer et al.

(10) Patent No.: US 12,492,322 B2
(45) Date of Patent: Dec. 9, 2025

(54) POLYUREA COATING SYSTEMS AS SEALANTS FOR THE EXTERIOR OF FUEL TANKS

(71) Applicant: Chemetall GmBH, Frankfurt (DE)

(72) Inventors: Michael Kraemer, Frankfurt am Main (DE); Christian Bruchertseifer, Oldenburg (DE); Peter Bons, Frankfurt am Main (DE)

(73) Assignee: CHEMETALL GMBH, Frankfurt (DE)

( * ) Notice: Subject to any disclaimer, the term of this patent is extended or adjusted under 35 U.S.C. 154(b) by 505 days.

(21) Appl. No.: 17/781,875

(22) PCT Filed: Dec. 18, 2020

(86) PCT No.: PCT/EP2020/086945
§ 371 (c)(1),
(2) Date: Jun. 2, 2022

(87) PCT Pub. No.: WO2021/123109
PCT Pub. Date: Jun. 24, 2021

(65) Prior Publication Data
US 2023/0018112 A1 Jan. 19, 2023

(30) Foreign Application Priority Data
Dec. 19, 2019 (EP) .................................... 19218222

(51) Int. Cl.
| | | |
|---|---|---|
| C09D 175/12 | (2006.01) | |
| B05D 1/02 | (2006.01) | |
| C08G 18/10 | (2006.01) | |
| C08G 18/38 | (2006.01) | |
| C08G 18/48 | (2006.01) | |
| C08G 18/50 | (2006.01) | |
| C08G 18/79 | (2006.01) | |
| C09D 175/02 | (2006.01) | |
| C09D 175/08 | (2006.01) | |

(52) U.S. Cl.
CPC ............. C09D 175/02 (2013.01); B05D 1/02 (2013.01); C08G 18/10 (2013.01); C08G 18/3885 (2013.01); C08G 18/4854 (2013.01); C08G 18/5027 (2013.01); C08G 18/797 (2013.01); C09D 175/08 (2013.01); C09D 175/12 (2013.01); *C08G 2150/00* (2013.01); *C08G 2190/00* (2013.01)

(58) Field of Classification Search
CPC . C09D 175/12; C08G 18/797; C08G 18/5027
See application file for complete search history.

(56) References Cited

U.S. PATENT DOCUMENTS

| | | | |
|---|---|---|---|
| 5,759,695 A | 6/1998 | Primeaux, II | |
| 9,534,072 B2 | 1/2017 | Gurke et al. | |
| 2014/0295088 A1 | 10/2014 | Hobbs et al. | |
| 2017/0240686 A1* | 8/2017 | Maier | .............. C09J 175/02 |
| 2019/0134652 A1 | 5/2019 | Busby et al. | |

FOREIGN PATENT DOCUMENTS

| | | | | |
|---|---|---|---|---|
| EP | 0118171 A2 | 9/1984 | | |
| EP | 0420426 A2 | 4/1991 | | |
| EP | 0813955 A2 | 12/1997 | | |
| EP | 2180958 A2 | 5/2010 | | |
| JP | 08100042 A | * 4/1996 | ............. | C08G 10/10 |
| JP | 2001172360 A | * 6/2001 | ............. | C08G 18/78 |
| JP | 2012092266 A | 5/2012 | | |

OTHER PUBLICATIONS

JP-2001172360_Jun. 26, 2001_English Translation.*
JP-08100042-A_Apr. 16, 1996_Kitobumi et al._ English Translation.*
International Search Report and Written Opinion for corresponding PCT/EP2020/086945 mailed Mar. 19, 2021, 12 Pages.

* cited by examiner

*Primary Examiner* — Michael L Leonard
(74) *Attorney, Agent, or Firm* — Armstrong Teasdale LLP

(57) ABSTRACT

Disclosed herein is a 2K coating system consisting of two components (A) and (B) being separate from each other, where (A) includes at least one constituent (a1) containing at least one aromatic moiety and bearing on average at least two primary and/or secondary amino groups, where (B) includes at least one constituent (b1) containing at least one aromatic moiety and bearing on average at least two isocyanate groups, where each of (A) and (B) has a solid content of at least 95 wt.-%, based on the total weight of the respective component, and constituent (b1) present in component (B) bears carbodiimide and/or uretonimine units and at least one structural unit (I). Also disclosed herein are a coating composition obtainable by mixing components (A) and (B), a method of using said coating composition as sealant, a method of applying the coating composition to a substrate, and a sealed substrate.

20 Claims, No Drawings

POLYUREA COATING SYSTEMS AS SEALANTS FOR THE EXTERIOR OF FUEL TANKS

CROSS-REFERENCE TO RELATED APPLICATIONS

This application is a U.S. National Phase Application of International Patent Application No. PCT/EP2020/086945, filed Dec. 18, 2020, which claims priority to European Patent Application No. 19218222.8, filed Dec. 19, 2019, each of which is hereby incorporated by reference herein.

The present invention relates to a 2K coating system consisting of two components (A) and (B) being separate from each other, wherein (A) comprises at least one constituent (a1) containing at least one aromatic moiety and bearing on average at least two primary and/or secondary amino groups, wherein (B) comprises at least one constituent (b1) containing at least one aromatic moiety and bearing on average at least two isocyanate groups, wherein each of (A) and (B) has a solid content of at least 95 wt.-%, based on the total weight of the respective component, and constituent (b1) present in component (B) bears carbodiimide and/or uretonimine units as well as at least one structural unit (I), a coating composition obtainable by mixing components (A) and (B) of the inventive coating system, a use of said coating composition as sealant, in particular for sealing the exterior of fuel tanks, a method of applying the coating composition to a substrate and in particular a method of sealing the exterior of fuel tanks, and a sealed substrate such as a sealed fuel tank obtainable by this method.

BACKGROUND OF THE INVENTION

As the demand for aircrafts increases and the production rate of aircrafts is also to be increased, aircraft manufacturers are interested in shortening their process times in aircraft manufacturing. One process to be accelerated is the application of so-called Secondary Fuel Barrier Coatings (SFB Coatings) to the fuel tanks of the aircrafts. The process times inter alia depend on the products used. In order to obtain fuel tanks coated with such an SFB coating, a sealant is sprayed onto the outside of the fuel tank, which is located in the aircraft fuselage. Depending on the geometry of the tanks other application methods such as brushing are also possible. Further, other application methods such as brushing can be used in case of maintenance operations. The fuel tank is usually sealed from the inside with a suitable sealant such as a polysulfide based sealant. As an additional protection a further coating is applied to the outer pre-coated surface of the fuel tanks. In case the inner seal becomes defective, the externally applied sealant prevents fuel or fuel vapors from escaping from the tank and entering the cargo and/or passenger area.

Said externally applied sealant is referred to as the aforementioned SFB coating. The sealant has to be resistant to fuel. In addition, the sealant must be transparent (i.e. clear) so that any cracks and/or damage in general to the tank surface can be easily and immediately detected from the outside in order to be repaired.

Polyurea and/or polyurethane coating for various purposes are known from the prior art, e.g., from US 2012/0183692 A1, U.S. Pat. No. 6,605,684 B2, U.S. Pat. No. 9,328,274 B2, JP 2012-92266 A and JPH-11130834 as well as from WO 2016/059083 A1: Transparent polyurea and/or polyurethane coatings prepared from solvent-free coating compositions are, e.g., known from US 2012/0183692 A1.

In particular, coatings prepared from polyaspartic amines and polyisocyanates are disclosed in this reference. These coatings are used as barrier coatings in order to protect the substrate to which the coatings are applied to. High volume low pressure (HVLP) guns are used in order to apply the coating compositions to a substrate. The compositions are cured at elevated temperatures such as around 54 to 65° C. Preparation of polyurea elastomers is disclosed in U.S. Pat. No. 6,605,684 B2. An aspartic ester is formed, which is then—after having been blended with a polyoxyalkylene amine—reacted with isocyanates to yield the desired polyurea elastomers. U.S. Pat. No. 9,328,274 B2 relates to urethane- and sulfur-containing prepolymers prepared from an isocyanate-terminated urethane-containing adduct and a bis(vinyl-sulfonyl)alkanol as well as to a composition containing such a prepolymer and an amine catalyst. Cured sealants can be obtained from these adducts, which are polyurethanes due to crosslinking reactions of the NCO-groups with OH-groups of the alkanols. Polyurea coatings prepared from aliphatic isocyanate compounds are disclosed in JP 2012-92266 A. Polyureas prepared from mixtures of polyamines including necessarily non-aromatic polyamines are disclosed in JPH-11130834. WO 2016/059083 A1 discloses poylurea coatings for patching defects in elastomeric substrates and/or for adhesively bonding together these substrates.

Polyurea sealants for aircraft antenna or other aircraft parts are disclosed in U.S. Pat. No. 10,052,817 B2 and U.S. Pat. No. 9,765,888 B2. These sealants can be flame-retardant and consist of two components, which are applied by using an assembly comprising a special cartridge system. A mixing rod is placed on top of this cartridge system. Both components are manually pressed into the mixing rod where they are mixed. The sealant is a linear polyurea component, which may contain carbon black for improved UV resistance. The sealants described in U.S. Pat. No. 10,052,817 B2 and U.S. Pat. No. 9,765,888 B2 are, however, not sprayable.

A special cartridge system for use with a Sulzer mix and spray gun, which is used for applying a sprayable two-component sealant being a polyurea, polyurethane and/or a polyurea-polyurethane hybrid sealant to an (aircraft) component is disclosed in WO 2017/172906 A2. Both components are separated in two chambers and the outlet of each chamber leads to a mixing rod in which both components are mixed by passing them through the mixing rod (manually or pneumatically). The sealant is fuel-resistant and can therefore be used as a secondary fuel vapor barrier in order to prevent fuel leakage in the event of leaks in a tank. The sealants are transparent, i.e. clear. However, a color change is observed after application, which is disadvantageous as this may prevent the detection of leaks in a fuel tank when the sealant is applied as secondary fuel vapor barrier. In addition, the sealants disclosed do not necessarily have to be VOC-free, which is problematic from an ecological point of view. A further disadvantage of the cartridge system disclosed in WO 2017/172906 A2 is that a use of the Sulzer mixing system described therein usually results in a large amount of plastic waste as the cartridges and mixing rods are made of plastic and must be disposed of after use.

Further, commercial coating systems for providing SFB coatings such as the commercial polyurethane based product "PR-1199" are available, which, however, often require a comparably long time for curing and, in addition, usually contain organic solvents, which is undesired at least for ecological reasons and/or due to VOC regulations. For example, it is often necessary to apply flash-off times of about 2 hours after application in order to allow the solvents present to begin to slowly evaporate and then to cure the coating afterwards for 24 hours at elevated temperatures. The waiting time in this process can therefore be at least 26 hours, which is disadvantageous for economic reasons since it consumes both time and energy. In addition, the commercially available coating systems for providing SFB coatings usually not only contain organic solvents, but also flame-retardants such as phosphorous-containing flame retardants, which is disadvantageous at least due to ecological reasons, but also for economic reasons as, e.g. safety regulations may apply, which have to be considered and performed. Polyurea compositions containing necessarily organic solvents as stabilizers and thus having an undesired high VOC-content are further known from WO 00/69943 A1.

From the prior art are also known coating compositions for use as sealants that cure upon irradiation of UV light. Such sealants and respective coating methods are, e.g., disclosed in WO 2016/128548 A1, WO 2016/128547 A1, EP 2 836 562 B1, EP 1 478 703 B1 and EP 1 385 904 B1. Further, in WO 2018/031532 A1 compositions are disclosed, which contain a polythiol as well as a urea- and/or urethane-containing polyalkenyl. This reference further discloses a sealant system consisting of two parts, wherein the polythiol is contained in the first and the polyalkenyl is contained in the second part. The composition and the system can be used to prepare actinic radiation-curable coatings and sealants for the aerospace industry and in particular as SFB coatings. The compositions of WO 2018/031532 A1 are sulfur-containing compositions, which is disadvantageous at least due to ecological reasons. Further, as the curing reaction has to be necessarily performed with UV light, expensive UV equipment and an additional work step are required, which causes additional costs and time. Moreover, additional safety regulations may apply, e.g., special protective measures against the UV light are required for the employees. In addition, by using a UV light source it is not always possible to perform a sufficient curing in areas that are difficult to access with the UV lamp due to the geometry of some components to be coated resulting in a risk that the sealant will not cure completely due to insufficient irradiation with UV light, thus leading to so-called "shadow areas". Moreover, often such UV curing compositions still contain organic solvents, which is undesired at least for ecological reasons and/or due to VOC regulations.

Thus, there is a demand for coating systems, coating compositions and for a method of coating of substrates, which do not exhibit the aforementioned disadvantages, in particular, when the substrates are fuel tanks and the coating compositions are used for providing SFB coatings. In particular, there is a demand for respective coating systems and compositions, which are essentially or entirely VOC-free but nonetheless sprayable and/or manually processible, in particular sprayable, and allow an auto-catalytic fast curing at low temperatures, in particular a curing to be performed at lower temperatures and in shorter time than conventional coating systems and coating compositions. At the same time, any potentially present cracks of and/or damages to the fuel tank surface should be readily detectable from the outside in order to make an immediate repair possible.

Problem

It has been therefore an object underlying the present invention to provide a coating system and a coating composition suitable for the coating of substrates, which do not exhibit the disadvantages of the conventional coating systems and compositions of the prior art, in particular, when the substrates are fuel tanks and the coating systems and compositions are used for providing SFB coatings. It has been a particular object underlying the present invention to provide respective coating systems and compositions, which are essentially or entirely VOC-free, but are still sprayable, and allow an auto-catalytic fast curing at low temperatures, in particular a curing to be performed at lower temperatures and in shorter time than conventional coating systems and coating compositions known in the prior art. At the same time, these coatings and compositions should allow an immediate detection of any potentially present cracks of and/or damages to the fuel tank surface in order to allow making a repair as soon as possible.

Solution

This object has been solved by the subject-matter of the claims of the present application as well as by the preferred embodiments thereof disclosed in this specification, i.e. by the subject matter described herein.

A first subject-matter of the present invention is a two-component (2K) coating system consisting of two components (A) and (B) being separate from each other,
wherein component (A) comprises at least one constituent
(a1) containing at least one aromatic moiety and bearing at least two primary and/or secondary amino groups,
wherein component (B) comprises at least one constituent
(b1) containing at least one aromatic moiety and bearing at least two isocyanate groups,
wherein each of components (A) and (B) has a solid content of at least 95 wt.-%, based on the total weight of the respective component,
wherein the amount of any fillers present in component (A) does not exceed 5 wt.-%, based on the total weight of component (A),
characterized in that constituent (b1) present in component (B) bears at least one carbodiimide and/or uretonimine unit and further comprises at least one structural unit (I):

wherein Fe is a $C_2$ to $C_8$ alkylene residue, and parameter m is an integer in the range of from 1 to 200.

A further subject-matter of the present invention is a coating composition obtainable by mixing components (A) and (B) of the inventive coating system with each other.

A further subject-matter of the present invention is a use of the inventive coating composition as sealant, in particular for providing a barrier coating on a preferably pre-coated substrate, preferably on the exterior of a preferably pre-coated fuel tank, in particular on the exterior of a preferably pre-coated aircraft fuel tank.

A further subject-matter of the present invention is a method of sealing a preferably pre-coated surface of a substrate, preferably of an exterior of a fuel tank, in particular an aircraft fuel tank, comprising at least step (1), namely
(1) applying the inventive coating composition onto the preferably pre-coated surface of a substrate, preferably of the exterior of a fuel tank, in particular of an aircraft fuel tank.

A further subject-matter of the present invention is a sealed substrate such as a sealed fuel tank, preferably a fuel tank bearing an exterior sealing, in particular an aircraft fuel tank bearing an exterior sealing, obtainable by the inventive method.

It has been surprisingly found that the inventive coating system and the inventive coating composition are suitable for the coating of substrates, in particular of fuel tanks such as fuel tanks used in the aerospace and/or aircraft industry. It has been in particular found in this regard that the inventive coating system and the inventive coating composition are suitable for providing SFB coatings to the exterior surface of such fuel tanks, i.e. for external sealing of such fuel tanks.

It has been further surprisingly found that the inventive coating system and the inventive coating composition allow an auto-catalytic rapid curing at low temperatures such as at room temperature (18 to 29° C.), in particular a curing to be performed at lower temperatures and in shorter time than conventional coating systems and coating compositions known in the prior art. Such a shortening of the process time results in a shortening of the customer's waiting time until the product has hardened. It has been found that curing of the inventive coating composition only takes two hours or even less, in particular 2 hours to 1.5 hours. Further, it is not only not necessary to apply high temperatures, e.g. of 40° C. or above for curing, but that there is also no need for applying external impulses such as UV light in order for the curing to take place. Thus, no additional energy is required.

It has been further found that the inventive coating systems and compositions can be provided in particular for the above mentioned purpose in essentially or entirely VOC-free form. Nonetheless, the inventive coating system is still sprayable, in particular when using a high-pressure system for mixing and applying with countercurrent injection technology, which in particular allows mixing and spraying to take place simultaneously. It has been further found that the use of such a high-pressure system does not result in any undesired producing of any plastic waste unlike, e.g., when using a Sulzer mix and spray gun such as disclosed in WO 2017/172906 A2. In addition, the inventive coating composition—since it is essentially or entirely VOC-free when applied to the substrate such as a fuel tank—does not have to "rest" after application because it is a solvent-free or essentially solvent-free system. Thus, no flashing-off period is necessary.

It has been further found that the inventive coating composition when applied as sealant is transparent (clear). This allows an immediate detection of any potentially present cracks of and/or damages to the fuel tank surface in order to allow making a repair as soon as possible, when using the coatings in the field of SFB coatings. Surprisingly, it has been found that coatings obtained from the inventive coating compositions exhibit significantly better properties with respect to tensile strength, Shore A hardness and/or elongation at break than conventional non-transparent polyurea coatings, which have been, e.g., obtained from coating compositions containing high amounts of fillers.

It has been further found that the inventive coating composition when applied as sealant is color-stable, i.e. does not change its color after mixing, unlike, e.g. the sealants after application as disclosed in WO 2017/172906 A2.

DETAILED DESCRIPTION OF THE INVENTION

Inventive Coating System and Inventive Coating Composition

The inventive coating system is a two-component (2K) coating system consisting of two components (A) and (B) being separate from each other. For example, components (A) and (B) of the inventive coating system can be stored separately until they are mixed with each other in order to prepare a coating composition, which can be in particular used as sealant.

The inventive coating system consists of a component (A), which comprises at least one constituent that bears primary and/or secondary amino groups, and of a component (B), which comprises at least one constituent that bears isocyanate (NCO) groups. Thus, upon mixing of these two components a polyurea or polyurea-based coating composition is formed by reaction of the amino groups with the isocyanate groups. In the sense of the present invention a "polyurea coating composition" is formed in case component (A) does not contain any additional constituents bearing OH-groups. In the sense of the present invention a "polyurea based coating composition" is formed in case component (A) contains additional constituents bearing OH-groups—however, said OH-groups being present in amounts significantly lower than of the amino groups—that lead to additional formation of urethane groups upon crosslinking with the isocyanate groups besides the polyurea formation.

Preferably, the inventive coating system is a sealant system consisting of components (A) and (B).

Preferably, none of the components (A) and (B) of the inventive coating system contains any curing catalysts. Preferably, of course, also the inventive coating composition does not contain any curing catalysts. Curing catalysts are not needed as the inventive coating system is, preferably, auto-catalytically cross-linkable, i.e. the relevant constituents present therein can be crosslinked via an auto-catalytic reaction.

Preferably, none of the components (A) and (B) of the inventive coating system contains any constituents, which in turn contains one or more sulfur atoms. Preferably, of course, also the inventive coating composition does not contain any constituents, which contain one or more sulfur atoms. If any constituent bearing one or more sulfur atoms is present in one of the components (A) and (B) of the inventive coating system and/or in the inventive coating composition at all, it is preferably selected from the group consisting of mercaptosilanes only.

Preferably, none of the components (A) and (B) of the inventive coating system contains any flame retardants. In particular, none of the components (A) and (B) of the inventive coating system contains any phosphorous-containing flame retardants. Preferably, of course, also the inventive coating composition does not contain any flame retardants, in particular no phosphorous-containing flame retardants.

Preferably, both components (A) and (B) of the inventive coating system are free or essentially free of organic solvents. The same preferably applies to the inventive coating compositions. In the sense of the present invention the term "free of organic solvents" preferably means that no organic solvents at all are present. In the sense of the present invention the term "essentially free of organic solvents" preferably means that essentially no organic solvents are present. This means that at least no organic solvents are added on purpose to any of the inventively used components (A) and (B) and to the inventive coating composition. It may, however, not be ruled out that remaining residues of organic solvents formed upon preparation of any of the constituents used for preparing the inventively used components (A) and (B) are present therein. Preferably, the amounts of any organic solvents present in each of the components (A) and (B) is less than 10 wt.-%, more preferably less than 8 wt.-%, even more preferably less than 6 wt.-%, still more preferably less than 5 wt.-%, yet more preferably less than 2.5 wt.-%, in particular less than 1.0 wt.-% or less than 0.5 wt.-%, most preferably less than 0.1 wt.-% or less than 0.05 wt.-% or less than 0.01 wt.-%, in each case based on the total weight of component (A) or (B).

The solids content of component (A) of the coating system according to the invention is at least 95 wt.-%, even more preferably >95 wt.-%, yet more preferably >97.5 wt.-%, in particular is >98 or >99 or >99.5 wt.-%, most preferably is 100 wt.-%, in each case based on the total weight of component (A). The solids content of component (B) of the coating system according to the invention is at least 95 wt.-%, preferably >95 wt.-%, more preferably >97.5 wt.-%, in particular is >98 or >99 or >99.5 wt.-%, most preferably is 100 wt.-%, based in each case on the total weight of component (B). The solids content of the coating composition according to the invention is preferably >95 wt.-%, more preferably >97.5 wt.-%, in particular is >98 or >99 or >99.5 wt.-%, most preferably is 100 wt.-%, based in each case on the total weight of the coating composition. The determination of the solids content, i.e. of the non-volatile content, is carried out according to the method described hereinafter.

Preferably, both components (A) and (B) of the inventive coating system are free or essentially free of water. The same applies to the inventive coating compositions. In the sense of the present invention the term "free of water" preferably means that no water at all is present. In the sense of the present invention the term "essentially free of water" preferably means that essentially no water is present. This means that at least no water is added on purpose to any of the inventively used components (A) and (B) and to the inventive coating composition. It may, however, not be ruled out that remaining residues of water formed upon preparation of any of the constituents used for preparing the inventively used components (A) and (B) are present therein. Preferably, the amount of any water present in each of the components (A) and (B) is less than 1 wt.-%, more preferably less than 0.5 wt.-%, even more preferably less than 0.1 wt.-%, still more preferably less than 0.05 wt.-%, yet more preferably less than 0.01 wt.-%, in particular less than 0.005 wt.-% or less than 0.001 wt.-%, in each case based on the total weight of component (A) or (B).

Preferably, none of the components (A) and (B) of the inventive coating system contains any constituents, which are crosslinkable via actinic radiation such as UV irradiation. Preferably, of course, also the inventive coating composition does not contain any constituents, which are crosslinkable via actinic radiation such as UV irradiation. In particular, none of the components (A) and (B) of the inventive coating system contains any constituents, which contain (meth)acrylic groups and/or unsaturated C—C-double bonds. The same applies, of course, also preferably to the inventive coating composition. Thus, preferably, the inventive coating composition as such is not crosslinkable via actinic radiation such as UV irradiation.

The term "comprising" in the context of the present invention in connection with the components (A) and (B) of the inventive coating system, and the coating composition according to the invention preferably has the meaning "consisting of". In this case, in addition to the constituents (a1) and (b1) present within components (A) and (B) one or more of the other constituents mentioned hereinafter such as constituents (a1) to (a7) optionally contained in each of the components of the inventive coating system or coating composition according to the invention may be contained in the coating system, its components (A) and (B) or coating composition according to the invention. All components can be present in each case in their preferred embodiments mentioned hereinafter.

The proportions and amounts in wt.-% (% by weight) of constituents (a1) and (b1) and further optionally present constituents (a1) to (a7) in the coating system, its components (A) and (B), or composition according to the invention add up to 100 wt.-%, based on the total weight of the respective component (A) or (B) of the coating system or based on the total weight of the coating composition.

Components (A) and (B)

Component (A) comprises at least one constituent (a1) containing at least one aromatic moiety and bearing at least two primary and/or secondary amino groups. Preferably, constituent (a1) comprises on average at least two primary and/or secondary amino groups. Preferably, constituent (a1) comprises at least two, preferably, precisely two, aromatic moieties, more preferably at least two, preferably precisely two, phenyl moieties.

Preferably, constituent (a1) comprises at least two primary amino groups.

Preferably, the at least two primary and/or secondary amino groups are directly bound to the at least one aromatic moiety of constituent (a1). More preferably, in case constituent (a1) comprises at least two, preferably, precisely two, aromatic moieties—more preferably at least two, preferably precisely two, phenyl moieties—at least one, preferably precisely one, of the at least two, preferably precisely two, primary and/or secondary amino groups is directly bound to each of the at least two, preferably precisely two, aromatic moieties.

The presence of precisely two amino groups is preferred as by this linear polyureas are obtained upon crosslinking with constituent (b1) of component (B).

Preferably, constituent (a1) further comprises at least one polyether moiety. Preferably, said polyether moiety is positioned structurally between the at least two aromatic moieties of constituent (a1) in case at least two of said aromatic moieties are present. However, in addition to or as alternative to said at least one polyether moiety, constituent (a1) may comprise at least one of a polyester, polybutadiene and/or poly(meth)acrylate unit.

Preferably, the at least one polyether moiety of constituent (a1) is a structural unit (II):

(II)

wherein $R^2$ is a $C_2$ to $C_8$ alkylene residue, more preferably a $C_2$ to $C_6$ alkylene residue, in particular a $C_2$ to $C_4$ alkylene residue and parameter n is an integer in the range of from 1 to 100, more preferably in the range of from 1 to 40, in particular in the range of from 1 to 20 or from 1 to 10, most preferably between 1 and 5.

Preferably, constituent (a1) is a constituent of general formula (III):

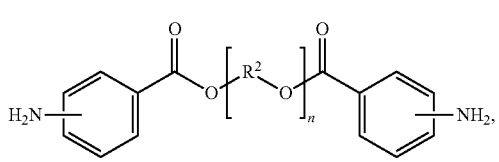

(III)

wherein R² and n have the aforementioned meanings and wherein each of the amino groups is positioned in m, o or p-position independently of one another in each of the phenyl rings, in particular in p-position in each case.

In particular preferred are constituents (a1) of general formula (IV) and/or (V):

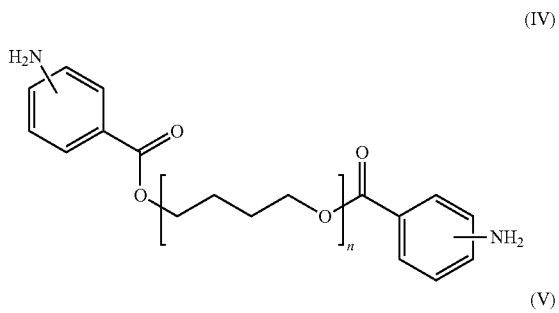

(IV)

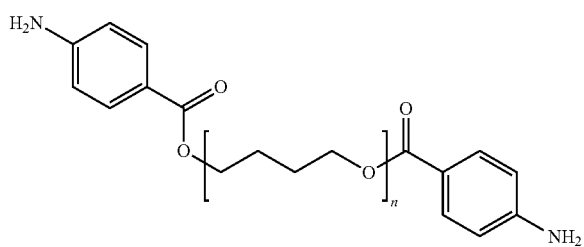

(V)

wherein n has in each case the aforementioned meaning.

Preferably, the at least one constituent (a1) has a number average molecular weight ($M_n$) in the range of from 200 to 7 500 g/mol, more preferably of from 200 to 5 000 g/mol, in particular of from 250 to 3 000 g/mol or of from 250 to 2 000 g/mol, most preferred of from 250 to 1 500 g/mol. The determination of $M_n$ is carried out according to the method described hereinafter.

Constituent (a1)—besides the at least two amino groups—may bear in principal further functional groups that are reactive towards NCO-groups such as OH-groups. However, preferably, constituent (a1) does not comprise such further functional groups, i.e. the amino groups present therein are the only groups that are reactive towards NCO groups.

Preferably, constituent (a1) is present in component (A) in an amount in the range of from 50 to 95 wt.-%, more preferably of from 55 to 90 wt.-%, even more preferably of from 60 to 85 wt.-%, still more preferably of from 65 to 85 wt.-%, in particular of from 70 to 80 wt.-%, based on the total weight of component (A).

Preferably, the amine number of constituent (a1) is in the range of from 50 to 400 mg KOH/g, more preferably of from 75 to 300 mg KOH/g. The amine number is determined according to DIN 16945:1989-03.

The amount of any fillers present in component (A) of the inventive coating system does not exceed 5 wt.-% (i.e., 5.0 wt.-%), based on the total weight of component (A). The term "filler" is known to the skilled person, from DIN 55943 (date: October 2001), for example. A "filler" for the purposes of the present invention is preferably a component, which is substantially, preferably entirely, insoluble in the medium surrounding them, such as each of components (A) and (B) and the composition of the invention, for example, and which is used in particular for increasing the volume. "Fillers" in the sense of the present invention preferably differ from "pigments" in their refractive index, which for fillers is <1.7, while the refractive index for pigments is ≥1.7. Preferably, a "filler" for the purposes of the present invention is an inorganic filler. Examples are barium sulfate or talcum.

Preferably, the amount of any fillers present in component (A) of the inventive coating system does not exceed 4.5 wt.-%, more preferably does not exceed 4.0 wt.-%, even more preferably does not exceed 3.5 wt.-%, still more preferably does not exceed 3.0 wt.-%, yet more preferably does not exceed 2.5 wt.-%, in particular does not exceed 2.0 wt.-% or 1.5 wt.-% or 1.0 wt.-% or 0.5 wt.-%, in each case based on the total weight of component (A). It is also possible that component (A) does not comprise any fillers. In the sense of the present invention this preferably means that component (A) is free or at least essentially free of fillers. This means that at least no fillers are added on purpose to the inventively used component (A) and to the inventive coating composition. Preferably, the amounts of fillers present in component (A) of the inventive coating system is in the range of from 0 to 5.0 wt.-%, more preferably in the range of from 0 to 4.0 wt.-%, even more preferably in the range of from 0 to 3.0 wt.-%, still more preferably in the range of from 0 to 2.0 wt.-%, yet more preferably in the range of from 0 to 1.0 wt.-% or of from 0 to 0.5 wt.-%, in particular in the range of from 0 to 0.1 wt.-%, or of from 0 to 0.01 wt.-%, in each case based on the total weight of component (A). In particular, however, component (A) of the inventive coating systems does not comprise any fillers.

Preferably, the amounts of any pigments present in components (A) of the inventive coating system is in the range of from 0 to 5.0 wt.-%, more preferably in the range of from 0 to 4.0 wt.-%, even more preferably in the range of from 0 to 3.0 wt.-%, still more preferably in the range of from 0 to 2.0 wt.-%, yet more preferably in the range of from 0 to 1.0 wt.-% or of from 0 to 0.5 wt.-%, in particular in the range of from 0 to 0.1 wt.-%, or of from 0 to 0.01 wt.-%, in each case based on the total weight of component (A). In particular, however, none of components (A) and (B) of the inventive coating systems comprises any pigments. In the sense of the present invention this preferably means that both components (A) and (B) are free or at least essentially free of pigments. This means that at least no pigments are added on purpose to any of the inventively used components (A) and (B) and to the inventive coating composition. Preferably, the amounts of pigments present in each of the components (A) and (B) is less than 3 wt.-%, more preferably less than 2 wt.-%, even more preferably less than 1 wt.-%, still more preferably less than 0.5 wt.-%, yet more preferably less than 0.1 wt.-%, in particular less than 0.01 wt.-%, in each case based on the total weight of component (A) or (B), respectively. The term "pigment" is known to the skilled person from DIN 55943 (date: October 2001), for example. A "pigment" in the sense of the present invention refers preferably to components in powder or flake form which are substantially, preferably entirely, insoluble in the medium surrounding them, such as each of components (A) and (B) and the composition of the invention, for example, and which is a colorant and/or substance which can be used as pigment on account of their magnetic, electrical and/or electromagnetic properties.

Preferably, both components (A) and (B) of the inventive coating system are transparent, i.e. clear. Preferably, of course, also the inventive coating composition is transparent, i.e. clear. In particular, none of the components (A) and (B) of the inventive coating system contains any pigments and/or fillers, in particular any color and/or effect imparting pigments and/or fillers. The same applies, of course, also preferably, to the inventive coating composition.

Component (A) of the inventive coating system may comprise one or more further optional constituents besides constituent (a1). All of these further optional constituents are different from each other and, further, different from constituent (a1).

Component (A) of the inventive coating system may further comprise one or more constituents (a2) bearing one or more OH-groups. Such constituents may be monomers, oligomers and/or polymers. Examples are OH-functional polyesters, OH-functional poly(meth)acrylates, OH-functional (meth)acrylic copolymers and/or OH-functional polyethers. However, preferably component (A) does not comprise such a constituent (a2).

As outlined hereinbefore, preferably component (A) does not contain any flame retardants such as phosphorous-containing flame retardants. However, optionally, component (A) of the inventive coating system may comprise at least one flame retardant as constituent (a3) such as at least one phosphorous-containing flame retardant, in particular at least one phosphate ester. If a flame retardant is used, it preferably is liquid (at 1 bar and 23° C.). Liquid flame retardants are preferred as they do not potentially impair the desired transparency of the final coating. In case a flame retardant is present in component (A), it is preferably present therein in an amount of 0.1 to 30 wt.-%, more preferably of 1 to 25 wt.-%, in particular of 5 to 20 wt.-%, based on the total weight of component (A). Higher amounts than 30 wt.-% are not desired as the mechanical properties of the final coating may deteriorate otherwise. An example of a suitable phosphate as flame retardant is diphenylcresylphosphate. It is also possible to use other phosphates such as e.g. triethyl phosphate, isopropylated triaryl phosphates and 2-ethylhexyl diphenyl phosphate. In principal additionally or alternatively also other flame retardants such as halogen-based flame retardants such as brominated or chlorinated flame retardants may be used, e.g. tris-(2-chloroisopropyl) phosphate. Another possibility would be the use of inorganic liquid compounds, such as liquid sodium water glasses.

Component (A) of the inventive coating system may further comprise one or more light stabilizers, in particular one or more UV stabilizers as constituent (a4). Examples are for instance sterically hindered amines (HALS: hindered amine light stabilizer). In principle, all commercially available light stabilizers of the Tinuvin® series or from other manufacturers can be used. Liquid light stabilizers are preferred as they do not potentially impair the desired transparency of the final coating. In case a light stabilizer is present in component (A), it is preferably present therein in an amount of 0.05 to 5 wt.-%, more preferably of 0.1 to 3.5 wt.-%, in particular of 0.1 to 2. wt.-%, based on the total weight of component (A).

Component (A) of the inventive coating system may further comprise one or more adhesion promoters as constituent (a5). In particular, organosilanes can be used as constituent (a5). Examples are e.g. (3-aminopropyl) trimethoxysilane, (3-aminopropyl)triethoxysilane, N-2-aminoethyl-3-aminopropyltrimethoxysilane, (3-mercaptopropyl)trimethoxysilane, (3-mercaptopropyl)triethoxysilane, (3-glycidyloxypropyl)trimethoxysilane and/or (3-glycidyloxypropyl)triethoxysilane, vinyltrimethoxysilane. Additionally or alternatively, other adhesion promoters may be used, e.g., titanates such as titanium acetylacetonate (TAA) and/or Ti-n-butanolate (TnBt). In case a constituent (a5) is present in component (A), it is preferably present therein in an amount of 0.05 to 5 wt.-%, more preferably of 0.1 to 3.5 wt.-%, in particular of 0.1 to 2 wt.-%, based on the total weight of component (A).

Component (A) of the inventive coating system may further comprise one or more additives as constituent (a6) selected from the group consisting of defoamers, reactive diluents such as bis-oxazolidines and/or aldimines, rheological additives, plasticizers such as phthalates, and viscosity reducers, in particular non-reactive viscosity reducers such as hydrocarbon mixtures based on naphthalene derivatives and/or indene-coumarone resins, tall oil and rapeseed methyl ester (biodiesel) and rapeseed oil and/or other ester-based diluents, as well as mixtures of such additives. These different additives to be used as constituent (a6) are different from one another. The use of at least one bis-oxazolidine containing amino groups such as secondary amino-groups is in particular preferred as constituent (a6). The bis-oxazolidine does not need to contain free amino groups. It is possible and preferred that any free amino groups contained therein such as secondary amino groups may be formed in situ later within component (A) or within the inventive coating composition, for example due to reaction with (residual) amounts of water. In other words, the bis-oxazolidine may contain amino groups in protected form. The same applies to any optionally present OH-groups within the bis-oxazolidine. An example is the commercial product Incozol® LV. In case at least one constituent (a6) is present in component (A), it is preferably present therein in an amount of 0.05 to 40 wt.-%, more preferably of 0.1 to 30 wt.-%, in particular of 0.1 to 20. wt.-%, based on the total weight of component (A). Specifically, in case at least one defoamer is present, its amount is preferably in the range of from 0.1 to 2.5 wt.-%, based on the total weight of component (A). Specifically, in case at least one reactive diluent is present, its amount is preferably in the range of from 0.1 to 20 wt.-%, based on the total weight of component (A). Specifically, in case at least one rheological additive is present, its amount is preferably in the range of from 0.1 to 5 wt.-%, based on the total weight of component (A). Specifically, in case at least one plasticizer is present, its amount is preferably in the range of from 0.1 to 2.5 wt.-%, based on the total weight of component (A). Specifically, in case at least one viscosity reducer is present, its amount is preferably in the range of from 0.1 to 20 wt.-%, based on the total weight of component (A).

Component (A) of the inventive coating system may further comprise one or more chain extenders as constituent (a7). Suitable chain extenders are diamines and/or triamines different from constituent (a1), which, preferably, do not contain any aromatic moieties. Rather, these chain extenders are diamines and/or triamines bearing aliphatic including cycloaliphatic residues. Such chain extenders may be used to adjust certain processing and final properties of the final coating. As diamines and/or triamines in particular dimer (fatty) amines and/or trimer (fatty) amines can be used, most preferred dimer amines. In particular, the use of such dimer amines may lead to a further improvement of the sprayability of the inventive coating composition by introducing a chemical thixotropy. Additionally, a faster drying/curing may be achieved. In addition, the use of dimer diamines may significantly improve the strength and chemical resistance of the coating. An example of a suitable diamine is Priamine® 1073 from Croda. The chain extenders react—besides constituent (a1) and optionally present constituent (a2)—with the NCO-groups of constituent (b1) of component (B). In case a constituent (a7) such as a diamine, in particular a dimer amine, is present in component (A), it is preferably present therein in an amount of 0.1 to 20 wt.-%, more preferably of 0.5 to 7.5 wt.-%, in particular of 1.0 to 5 wt.-%, based on the total weight of component (A).

Component (A) of the inventive coating system may comprise one or more further constituents bearing at least two primary and/or secondary amino groups, which are different from constituent (a1) such as, e.g. non-aromatic amino-group containing constituents and/or constituents (a6) and/or (a7). In that case the amount of constituent (a1) is preferably higher than the amount of the one or more other amino-group containing constituent(s) in component (A). Preferably, the relative weight ratio of constituent (a1) to said one or more other amino-group containing constituent (s) in component (A) is at least in the range of from 2:1 or at least in the range of from 3:1 or at least in the range of from 5:1 or at least in the range of from 10:1.

In particular, constituent (a1) is the only amino-group containing constituent present in component (A). Alternatively, constituent (a1) is in particular used in combination with a constituent (a6) such as an amino-groups containing bis-oxazolidine, in particular a bis-oxazolidine containing two amino groups.

Component (B) of the inventive coating system comprises at least one constituent (b1) containing at least one aromatic moiety and bearing at least two isocyanate groups. Preferably, constituent (b1) comprises on average at least two isocyanate groups. Preferably, the NCO-functionality is of from 2.0 to 3.0, more preferably of from 2.0 to 2.8, in particular of from 2.0 to 2.5, most preferably of from >2.0 to 2.2.

Preferably, the NCO content, i.e. the amount of NCO-groups present in constituent (b1) is in the range of from 10 to 35 wt.-% or of from 20 to 35 wt.-%, more preferably of from 15 to 30 wt.-%, in particular of from 20 to 27.5 wt.-%, based on the total weight of constituent (b1).

Preferably, constituent (b1) is based on/prepared by making use of an aromatic diisocyanate. The term aromatic diisocyanate herein refers to an isocyanate compound in which two isocyanate groups present in a molecule are directly bound to an aromatic ring. Preferred aromatic diisocyanates are 4,4'-diphenylmethane diisocyanate and 2,4'-diphenylmethane diisocyanate (MDI), 4,4'-diphenyl ether diisocyanate, p-phenylene diisocyanate, m-phenylene diisocyanate, 3,3'-dimethoxy-4,4'-biphenyl diisocyanate, o-toluidine diisocyanate, naphthylene diisocyanate, 2,4-tolylene diisocyanate, 2,6-tolylene diisocyanate, 3,3'-dimethyl-4,4'-diphenyl ether diisocyanate and 3,3'-dimethyl-4,4'-diphenyl ether diisocyanate. These may be used singly or in combinations of two or more thereof. A particularly preferable aromatic diisocyanate is at least one selected from the group consisting of 4,4'-diphenylmethane diisocyanate, 2,4'-diphenylmethane diisocyanate 2,4-tolylene diisocyanate and 2,6-tolylene diisocyanate. 4,4'-diphenylmethane diisocyanate (MDI) is most preferred.

The at least one carbodiimide and/or uretonimine structural unit within constituent (b1) can be formed by various methods where an aromatic diisocyanate is subjected to a decarboxylation condensation reaction accompanied with decarbonation to produce isocyanate-terminated constituents (b1) containing carbodiimide and/or uretonimine units. The decarbonation condensation reaction of the aromatic diisocyanate compound usually progresses in the presence of a carbodiimidation and/or uretonimination catalyst. Examples of such catalysts can include phospholene oxides such as 1-phenyl-2-phospholene-1-oxide, 3-methyl-1-phenyl-2-phospholene-1-oxide, 1-ethyl-2-phospholene-1-oxide, 3-methyl-2-phospholene-1-oxide, and 3-phospholene isomers thereof. The amount of the catalyst is usually 0.1 to 1.0 wt.-% relative to the aromatic diisocyanate compound for use in carbodiimidation and/or uretonimination.

Constituent (b1) present in component (B) bears at least one carbodiimide and/or uretonimine unit. Carbodiimide units have the following structural formula and can be formed by condensation of two isocyanate groups:

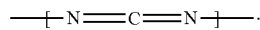

Uretonimine units have the following structural formula and can be formed by condensation of three isocyanate groups:

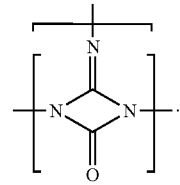

Preferably, the amount of carbodiimide and/or uretonimine units, in particular of uretonimine units, within constituent (b1) is in the range of from 4 to 18 wt.-%, more preferably of from 5 to 16 wt.-%, in particular of from 6 to 14 wt.-%, most preferred of from 8 to 12 wt.-%, in each case based on the total weight of constituent (b1).

For example, in case constituent (b1) is based on/prepared by making use of 4,4'-diphenylmethane diisocyanate (MDI) as an aromatic diisocyanate and contains at least one carbodiimide unit, it can have/can comprise the following structure, wherein parameter o is an integer of 1 to 50:

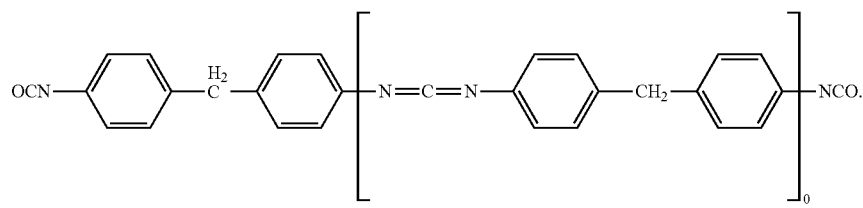

For example, in case constituent (b1) is based on/prepared by making use of 4,4'-diphenylmethane diisocyanate (MDI) as an aromatic diisocyanate and contains precisely one uretonimine unit, it can have/can comprise the following structure:

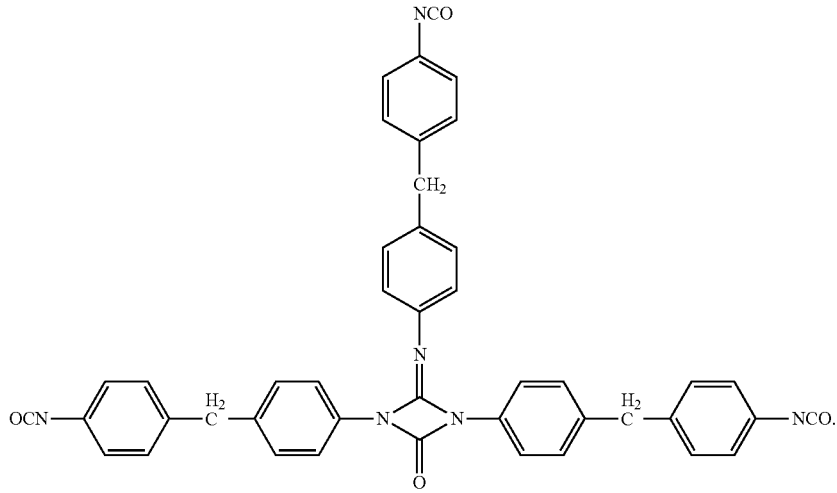

As outlined above, an aromatic diisocyanate such as MDI can be used to prepare constituent (b1), wherein at least one carbodiimide and/or uretonimine structural unit is formed. It is additionally or alternatively possible to use—instead of or in addition to monomeric MDI (MMDI)—polymeric aromatic diisocyanates such as PMDI. The PMDI to be used preferably has a number average molecular weight ($M_n$) in the range of from 400 to 5 000 g/mol. The determination of $M_n$ is carried out according to the method described hereinafter. The PMDI preferably has an NCO functionality in the range of from 2.6 to 3.0.

However, the inventively used constituent (b1) of component (B) necessarily bears ether segments due to the presence of at least one structural unit (I) in constituent (b1).

Thus, the aromatic diisocyanate used for preparing (b1) such as both MMI and PMDI is first—i.e. before performing a condensation reaction in order to form at least one carbodiimide and/or uretonimine unit—subjected to prepare MMI and/or PMDI based prepolymers by reaction of MMI and/or PMDI with OH-functional extenders, in particular with OH-functional polyethers such as polyether diols. As a result, isocyanate-functional prepolymers based on MMDI and/or PMDI can be prepared, which bear at least two NCO-groups and contain, e.g., polyether segments. For example, MMDI can be "extended" by using a polyether polyol and then the resulting prepolymer is subjected to a condensation reaction in order to form at least one carbodiimide and/or uretonimine unit.

Preferably, constituent (b1) is obtainable by subjecting at least one prepolymer of an aromatic diisocyanate, preferably of MDI, bearing at least two isocyanate groups, which prepolymer has been prepared by reaction of a polyether polyol with at least one aromatic diisocyanate and/or a polymer thereof, to a decarboxylation condensation reaction under formation of at least one carbodiimide and/or uretonimine unit.

The prepolymers such as MDI prepolymers preferably have a number average molecular weight ($M_n$) in the range of from 200 to 75 000 g/mol, more preferably of from 220 to 50 000 g/mol, in particular of from 300 to 35 000 g/mol or of from 350 to 20 000 g/mol. The determination of $M_n$ is carried out according to the method described hereinafter. The prepolymers such as MDI prepolymers preferably have an NCO functionality in the range of from 1.9 to 3.0.

It is particularly preferred to use a prepolymer such as an MDI prepolymer as described above in the above-described decarboxylation condensation reaction accompanied with decarbonation to produce isocyanate-terminated constituents (b1) containing at least one carbodiimide and/or uretonimine unit. By this, it is possible to prepare constituents (b1) having not only at least one carbodiimide and/or uretonimine unit, but also polyether units.

Constituent (b1) comprises at least one polyether moiety. The at least one polyether moiety of constituent (b1) is a structural unit (I):

wherein $R^1$ is a $C_2$ to $C_8$ alkylene residue, more preferably a $C_2$ to $C_6$ alkylene residue, in particular a $C_2$ to $C_4$ alkylene residue, most preferably a $C_2$ and/or $C_3$ alkylene residue and parameter m is an integer in the range of from 1 to 200, more preferably in the range of from 1 to 100, in particular in the range of from 1 to 40, most preferably between 1 and 10.

Component (B) of the inventive coating system may comprise further constituents besides (b1). Preferably, however, component (B) of the inventive coating system does not comprise any further constituent other than constituent (b1). In case further constituents such as a constituent (b2) are present, these are preferably selected from monomeric aromatic diisocyanates, e.g., MDI as such, and polymeric aromatic diisocyanates such as PMDI.

Component (B) of the inventive coating system may comprise one or more further constituents bearing at least two isocyanate groups, which are different from constituent (b1) such as, e.g. non-aromatic NCO-group containing constituents. In that case the amount of constituent (b1) is preferably higher than the amount of the one or more other NCO-group containing constituent(s) in component (B). Preferably, the relative weight ratio of constituent (b1) to said one or more other NCO-group containing constituent(s) in component (B) is at least 2:1 or at least 3:1 or at least 5:1 or at least 10:1.

In particular, constituent (b1) is the only NCO-group containing constituent present in component (B).

Preferably, the amount of structural unit (I) within constituent (b1) is 30 wt.-% or less, in particular 25 wt.-% or less, most preferably 20 wt.-% or less, in each case based on the total weight of constituent (b1). Preferably, structural unit (I) is present within constituent (b1) in an amount of 1 to 30 wt.-%, more preferably of 1.5 to 25 wt.-%, in particular of 2 to 20 wt.-%, most preferably of 2.5 to 15 wt.-% or of 3.0 to 10 wt.-%, in each case based on the total weight of constituent (b1).

Preferably, the at least one constituent (b1) has a number average molecular weight ($M_n$) in the range of from 300 to 60 000 g/mol, more preferably of from 400 to 45 000 g/mol, in particular of from 500 to 35 000 g/mol or of from 600 to 25 000 g/mol, most preferably of from 1 000 to 15 000 g/mol or of from 1 500 to 10 000 g/mol. The determination of $M_n$ is carried out according to the method described hereinafter.

Preferably, constituent (b1) is present in component (B) in an amount in the range of from 80 to 100 wt.-%, more preferably of from 85 to 100 wt.-%, even more preferably of from 90 to 100 wt.-%, still more preferably of from 95 to 100 wt.-%, in particular of from 97.5 to 100 wt.-%, based on the total weight of component (B).

Preferably, component (B) of the inventive coating system does not comprise any flame retardants such as phosphorous-containing flame retardants. In particular, component (B) does not contain any organic phosphate esters such as triethyl phosphate.

Preferably, the amount of any fillers present in component (B) of the inventive coating system does not exceed 4.0 wt.-%, more preferably does not exceed 3.5 wt.-%, even more preferably does not exceed 3.0 wt.-%, still more preferably does not exceed 2.5 wt.-%, yet more preferably does not exceed 2.0 wt.-%, in particular does not exceed 1.5 wt.-% or 1.0 wt.-%, in each case based on the total weight of component (B). It is also possible and preferred that component (B) does not comprise any fillers. In the sense of the present invention this preferably means that component (B) is free or at least essentially free of fillers. This means that at least no fillers are added on purpose to the inventively used component (B) and to the inventive coating composition.

A further subject-matter of the present invention is a coating composition obtainable by mixing components (A) and (B) of the coating system with each other.

All preferred embodiments described above herein in connection with the inventive coating system and the preferred embodiments thereof, are also preferred embodiments of the inventive coating composition.

Preferably, the inventive coating composition is a sealant.

Preferably, the amounts of any fillers present in the inventive coating composition is in the range of from 0 to 4.0 wt.-%, more preferably in the range of from 0 to 3.5 wt.-%, even more preferably in the range of from 0 to 3.0 wt.-%, still more preferably in the range of from 0 to 2.5 wt.-%, yet more preferably in the range of from 0 to 2.0 wt.-% or of from 0 to 1.5 wt.-%, in particular in the range of from 0 to 1.0 wt.-%, or of from 0 to 0.5 wt.-%, in each case based on the total weight of the coating composition.

Preferably, the obtained coating composition is sprayable.

Preferably, the coating composition is obtainable by mixing components (A) and (B) in a weight ratio (component (A)/component (B)) in the range of from 5:1 to 1:2. More preferably, mixing is performed in a weight ratio in the range of from 4.5:1 to 1:1.5, even more preferably in a weight ratio in the range of from 4:1 to 1:1.1, in particular in a weight ratio in the range of from 3.5:1 to 1:1, most preferred in a weight ratio in the range of from 3.25:1 to 1.1:1.

Mixing is preferably performed in a high-pressure device with countercurrent injection technology by making use of the impingement mixing principle.

Mixing of components (A) and (B) is in particular performed as follows:

Components (A) and (B), being located in separate containers, are transferred separately via proportioning pumps to a heating element such as a block heater. Transfer of the components is accomplished via a pre-heated pipe to an impingement mixing chamber within a spray gun. Such mixing chambers with the corresponding bores are manufactured in special geometries in order to be able to homogeneously mix the volume flows of components (A) and (B) with maximum turbulence in fractions of a second. For this purpose, for example, gaps offset by a few hundred nanometers from each other are used. This can be achieved with extremely strict manufacturing tolerances. The reaction mixture thus produced is discharged to the front via an outlet gap and sprayed onto the surface of the substrate such as a fuel tank surface. This means that preferably, no static mixer/mixing rod is used in this mixing system. When the trigger of the spray gun is pulled, in the mixing chamber components (A) and (B) are mixed at high pressure at elevated temperatures with maximum turbulence within sub-seconds. Preferably, component (A) is mixed at a pressure in the range of from 95 to 170 bar, in particular of from >100 to 165 bar. This mixing takes place, preferably, at a temperature in the range of from 70 to 80° C. Preferably, component (B) is mixed at a pressure in the range of from 80 to 140 bar, in particular of from >85 to 130 bar. This mixing takes place, preferably, at a temperature in the range of from 50 to 65° C. The reactive mixture is then explosively discharged at the orifice of the gun. When the trigger of the gun is released the opening of the mixing chamber is blocked mechanically and the mixing process is interrupted. A needle-like bolt can close the mixing chamber and thus has a mechanical self-cleaning effect. A fundamental advantage of this mixing technology over the static mixer principle is that short work interruptions are practically possible at any time without changing the mixing module or mixing chamber.

This mixing principle/system is in particular advantageous compared to the Sulzer mixing system (with static mixer/mixing rod) described in WO 2017/172906 A2, which is operated by compressed air. A disadvantage of the Sulzer mixing system is that due to the use of compressed air many, very small air bubbles are introduced into the sealant during the spraying process because the spraying is carried out by means of compressed air. In contrast, when mixed in the high-pressure system with countercurrent injection technology, the sealant is essentially free of air bubbles, meaning that no additional air bubbles are introduced/injected into the sealant. Further, the use of the Sulzer mixing system results in a large amount of plastic waste, as the cartridges and mixing rods are made of plastic and must be disposed of after use. In contrast, the above described mixing system does not produce any plastic waste.

Mixing techniques and systems suitable for mixing components (A) and (B) and for spraying the resulting inventive coating composition are, e.g., disclosed in WO 2018/050482 A1 and EP 1 264 640 B1.

Inventive Use, Inventive Method and Inventive Coated Substrate

A further subject-matter of the present invention is the use of the inventive coating composition as sealant, in particular for providing a barrier coating on a preferably pre-coated substrate, preferably on the exterior of a preferably pre-coated fuel tank, in particular on the exterior of a preferably pre-coated aircraft fuel tank.

All preferred embodiments described above herein in connection with the inventive coating system and the inventive coating composition and the preferred embodiments thereof, are also preferred embodiments of the inventive use.

A further subject-matter of the present invention is a method of sealing a preferably pre-coated surface of a substrate, preferably of an exterior of a fuel tank, in particular an aircraft fuel tank, comprising at least step (1), namely (1) applying preferably spraying and/or brushing, in particular spraying, the inventive coating composition onto the preferably pre-coated surface of a substrate, preferably of the exterior of a fuel tank, in particular of an aircraft fuel tank.

All preferred embodiments described above herein in connection with the inventive coating system and the inventive coating composition and the inventive use and the preferred embodiments thereof, are also preferred embodiments of the inventive method.

This can be done with a 2K-compressed air supported cartridge apparatus, with a 2K-low pressure or 2K-high pressure dosing system. It may also be done manually. Preferably, the same device is used for the step (1), which is also used for mixing of components (A) and (B), i.e. by making use of a high-pressure device (>150 bar) with countercurrent injection technology and by further making use of the impingement mixing principle.

The inventive coating composition is preferably sprayed onto the outside of fuel tanks located in the aircraft fuselage. The fuel tank is normally internally sealed with an internal sealant such as a polysulfide sealant. As additional protection, if the inner seal becomes defective, the externally applied inventive sealant prevents fuel or fuel vapors from escaping from the tank and entering the cargo and/or passenger area, in case the fuel tank is an aircraft fuel tank. In addition, the inventive sealant is resistant to fuel. In addition, the inventive sealant is transparent so that cracks/damage to the tank surface can be detected from the outside and be repaired. The inventive sealant can be removed relatively easily for repair. The inventive sealant also adheres well to various substrates, e.g. epoxy paints, aluminum and aluminum alloys, other sealants such as polysulfide sealants, polyurethane materials, and to itself, so that repairs can be carried out easily.

Preferably, the inventive method further comprises a curing step (2), namely (2) curing the applied, in particular sprayed, inventive coating composition at ambient temperature (18 to 23° C.) for 0.5 to 5 hours, preferably 1 to 4 hours.

Preferably, the inventive coating composition is applied onto a surface of a substrate in a dry layer thickness in the range of from 15 to 50 µm, in particular of from 20 to 45 µm.

A further subject-matter of the present invention is a sealed substrate such as a sealed fuel tank, preferably a fuel tank bearing an exterior sealing, in particular an aircraft fuel tank bearing an exterior sealing, obtainable by the inventive method.

All preferred embodiments described above herein in connection with the inventive coating system and the inventive coating composition and the inventive use as well as the inventive method and the preferred embodiments thereof, are also preferred embodiments of the inventive coated substrate.

The substrates used are preferably metal substrates, in particular aluminum and/or aluminum alloy substrates. However, fiber based composites such as carbon fiber composites may also be used as substrates. Preferably, these substrates are fuel tanks, in particular for the aircraft industry. They may be subjected to a pretreatment and/or a pre-coating, e.g., with an epoxy based coating, before applying the inventive sealant to them. Preferably, the substrates used bear at least one preferably cured coating layer such as an epoxy based coating layer, before the inventive coating composition is applied thereto. If such at least one preferably cured coating layer such as an epoxy based coating layer is present on the substrate before the inventive coating composition is applied thereto, the substrate is a pre-coated substrate.

Methods

1. Solid Content

The solid content (non-volatile content) is determined via DIN EN ISO 3251:2008-06 at 105° C. for 60 min.

2. VOC Content

The content of volatile organic compounds (VOC) is determined via ASTM D3960 (05-2018).

3. Dry Through Time (Curing Time)

The dry through time is determined as disclosed in Federal Test Method Standard 141D, method 4061.3 (Mar. 22, 2001).

4. Hardness

The hardness, in particular shore A hardness, is measured according to ASTM D 2240:2015 using a type A durometer.

5. Peel Strength

The peel strength is determined according to ASTM B571-18.

6. Tensile Strength and Elongation

Tensile strength and elongation are measured according to ASTM D 412:2016.

7. Viscosity

Viscosity is measured using an RVF Brookfield viscometer with spindle 5 at 20 rpm according to AS 5127/1 Rev. C from SAE International.

8. Low Temperature Flexibility Test

The Low Temperature Flexibility Test is performed as described in AS 5127/1 Rev. C from SAE International.

9. Pressure Rupture Test

The pressure rupture test is performed according to AS 5127/1 Rev. C from SAE International.

10. Bending Test

The bending test is performed according to ASTM D522-17, Method A.

11. Number Average Molecular Weight

The number average ($M_n$) molecular weights are determined by means of gel permeation chromatography (GPC) with tetrahydrofuran as eluent and using a polystyrene standard based on DIN 55672-1 (date: August 2007). A styrene-divinylbenzene copolymer is used as column material.

EXAMPLES

The following examples further illustrate the invention but are not to be construed as limiting its scope. In the following, all amounts given in the Tables are parts by weight if not indicated otherwise.

1. Preparation of Inventively Used Components (A) and (B)

1.1 In Table 1 all constituents used for preparing component (A) are listed. All constituents used are solvent-free. Diisopropyl naphthalene (isomeric mixture) has a boiling point of 290-300° C. and thus does not contribute to any VOC content. Versalink® P-1000 is a commercial product of the company Evonik and is an oligomeric diamine, namely poly(1,4-butanediol) bis(4-aminobenzoate), which is liquid at room temperature (23° C.) (amine equivalent weight: 575-625). The reactive diluent, HALS, UV absorbers I and II, defoamers I and II, air release agents I and II and rheological additives I and II used are in each case commercially available products.

1.2 In Table 1 also the constituent used for preparing component (B) is listed. A commercial solvent-free product has been used, namely SUPRASEC® 2029, which is a commercial product of the company Huntsman and is a uretonimine modified MDI containing polyether moieties and having on average 2.1 NCO-groups (NCO content: 24.5 wt.-%).

2. Preparation of Inventive Coating Compositions and Investigation of their Properties and of Properties of the Coatings Resulting Therefrom Exemplary coating compositions 1 to 5 (examples 1 to 5) are prepared from the components (A) and (B) listed in Table 1. 100 parts by weight of component (A) have in each case been mixed with 33 parts by weight of component (B). The resulting coating composition obtained from components (A) and (B) is then sprayed onto a substrate at 23° C.

Mixing and spraying is performed as follows: the respective components (A) and (B) are transferred separately via proportioning pumps to a block heater. Transfer of the components (A) and (B) is accomplished via a heated pipe to an impingement mixing chamber into a spray gun. When the trigger of the spray gun is pulled, in the mixing chamber components (A) and (B) are mixed at high pressure (>150 bar) at 70-80° C. with maximum turbulence within sub-seconds. The reactive mixture is then explosively discharged at the orifice of the gun. When the trigger of the gun is released the opening of the mixing chamber is blocked mechanically and the mixing process is interrupted.

Inventively used component (A) shows very favorable and unique gelation and curing properties when reacted with inventively used component (B). A long pot life and a rapid curing are surprisingly observed. In contrast, when component (A) is reacted with MDI as a comparatively used constituent (b1) only (i.e. with a non-modified MDI) it has been experimentally found that curing is less effective (delayed) and a higher tackiness is observed. Moreover, mechanical properties of such cured materials are inferior compared to the inventive coating system, which makes use of inventively used component (B).

The coating composition applied to the substrate represents a sealant. As substrate a fuel tank of an aircraft has been used. The tank is made of aluminum, which is pre-treated according to MIL-DTL-5541, class 1A, and then coated with a commercially available epoxy based coating. Further, a carbon fiber based composite substrate has been used, which is also coated with a commercially available epoxy based coating.

The curing time (dry through time) after application was in each case 2 hours. After these 2 hours, the curing was completed. Curing was performed at 23° C.

All inventive sealants passed the bending test according to ASTM D522 Method A.

For the sealant of examples 1, 2 and 5 the following properties have been determined:

The viscosity of the sealant, measured 10 minutes after mixing, is 50-150 Pas.

The hardness of 60-90 Shore A at 23° C. is achieved in 16-24 hours. No tackiness is observed after this time. The final hardness is 81 Shore A (for example 1).

The peel strength is 5-25 pounds per inch width, even after storage in fuel and water for 7 days at 23° C. and 60° C.

The specific density is 1.14 g/cm$^3$ (range: 1.0-1.30 g/cm$^3$) (for example 1).

The sealant must show a certain flexibility even at low temperatures, which can occur at flight altitude. This is tested by the Low Temperature Flexibility Test according to AS 5127/1 Rev. C at −54° C. The exemplary sealants passed the test. The sealant is in each case applied in a layer thickness of 25-38 μm.

The sealant is in each case transparent, so that defects on the tank surface can be seen through the sealant.

The sealant has a pressure resistance at RT (Pressure Rupture according to AS5127/1 Rev. C) of 30 psi (example 1).

TABLE 1

| | Example 1 | Example 2 | Example 3 | Example 4 | Example 5 |
|---|---|---|---|---|---|
| | Component (A) | Component (A) | Component (A) | Component (A) | Component (A) |
| Versalink ® P-1000 | 79.70 | 75.00 | 75.00 | 75.00 | 74.20 |
| Diphenylkresyl phosphate | 16.00 | 15.50 | — | 20.00 | — |
| Triethyl phosphate | — | — | 20.00 | — | — |
| Diisopropyl napthalene (isomeric mixture) | — | — | — | — | 15.50 |
| Reactive diluent | — | 5.50 | — | — | 5.50 |
| HALS (hindered amine light stabilizer), | 0.30 | 0.50 | — | — | 0.30 |
| UV absorber I | 1.00 | — | — | — | 1.00 |
| UV absorber II | — | 0.50 | 1.00 | 1.00 | — |
| Defoamer I | — | — | 0.20 | 0.20 | — |
| Defoamer II | — | — | 0.80 | 0.80 | — |
| Air release additive I | 1.50 | 1.50 | — | — | — |
| Air release additive II | — | — | — | — | 1.50 |

TABLE 1-continued

|  | Example 1 | Example 2 | Example 3 | Example 4 | Example 5 |
|---|---|---|---|---|---|
| Silquest ® A 187 | 1.00 | 1.00 | 1.00 | 1.00 | 1.00 |
| Rhelogical additive I | — | — | 2.00 | 2.00 | — |
| Rhelogical additive II | 0.50 | 0.50 | — | — | 1.00 |
| Σ | 100.00 | 100.00 | 100.00 | 100.00 | 100.00 |
|  | Component (B) | Component (B) | Component (B) | Component (B) | Component (B) |
| SUPRASEC ® 2029 | 100.00 | 100.00 | 100.00 | 100.00 | 100.00 |

3. Preparation of Comparatively Used Components (A) and (B) and of Coating Compositions According to Comparative Examples 1 and 2 as Well as Investigation of the Properties of the Resulting Coatings 3.1 In Table 2 all constituents used for preparing comparatively used component (A) are listed. In each case components (A) contain a significant amount of fillers such as barium sulfate, talcum, fumed silica and aluminum trihydroxide. The air release agent, rheological additive, dispersing agent and plasticizer used are in each case commercially available products.

In Table 2 also the constituents used for preparing comparatively used component (B) are listed. Mixture M1 is a mixture of SUPRASEC® 2029, an NCO-groups containing MDI prepolymer and a stabilizer.

3.2 Comparative coating compositions 1 and 2 are prepared from the components (A) and (B) listed in Table 2. 100 parts by weight of component (A) have been mixed with 20 parts by weight of component (B) for preparing Comparative example 1. 100 parts by weight of component (A) have been mixed with 10 parts by weight of component (B) for preparing Comparative example 2. The resulting coating composition obtained from components (A) and (B) is then sprayed onto a substrate.

The application method is performed as outlined in detail within item 2. By this method respective cured coatings can be obtained.

3.3 Properties of the coatings obtained from comparative coating compositions 1 and 2 have been investigated and compared with the coatings obtained from inventive coating compositions 1, 2 and 5.

It can be seen from Table 3 that with significantly amounts of filler containing comparative examples 1 and 2 only an insufficient tensile strength is achieved compared to inventive examples 1, 2 and 5. With respect to comparative example 1 additionally an only insufficient elongation is achieved.

TABLE 2

|  | Comparative example 1 | Comparative example 2 |
|---|---|---|
|  | Component (A) | Component (A) |
| Versalink ® P-1000 | 30.0 | 30.0 |
| Aluminum trihydroxide | 40.8 | — |
| Barium sulfate | — | 49.6 |
| White pigment paste | 1.30 | 1.30 |
| Black pigment paste | 0.70 | 0.70 |
| Dispersing agent | 0.40 | 0.40 |
| Talkum | 5.0 | — |
| Fumed silica | 0.5 | — |
| Plasticizer | 14.0 | 16.0 |
| Alumosilicate | 3.0 | — |
| Air release additive | 1.0 | 1.0 |

TABLE 2-continued

|  | Comparative example 1 | Comparative example 2 |
|---|---|---|
| Silquest ® A 187 | 3.0 | 1.0 |
| Rheological additive | 0.3 | — |
| Σ | 100.00 | 100.00 |
|  | Component (B) | Component (B) |
| SUPRASEC ® 2029 | — | 100.00 |
| Mixture M1 | 100.0 | — |

TABLE 3

|  | Example 1 | Example 2 | Example 5 | Comparative example 1 | Comparative example 2 |
|---|---|---|---|---|---|
| Elongation [%] | 500 | 420 | 400 | 200 | 500 |
| Tensile strength [MPa] | 19 | 18 | 20 | 6 | 6 |

4. Preparation of Further Comparatively and Inventively Used Components (A) and (B) and of Coating Compositions Obtained Therefrom as Well as Investigation of the Properties of the Resulting Coatings 4.1 In Table 4 all constituents used for preparing further comparatively and inventively used components (A) and (B) are listed. Exemplary coating composition 6 (example 6) and comparative coating compositions 3, 4, 5 and 6 (comparative examples 3 to 6) are prepared from these components (A) and (B) as listed in Table 4.

Reactive diluent, UV absorbers I and II, defoamer I and rheological additive I are in each case commercially available products. Masterseal® M800 PTB is the hardener component of commercially available product Masterseal® M800, being a MDI-based prepolymer with a NCO-group content of 12 wt.-%. Masterseal® M689 PTB is the hardener component of commercially available product Masterseal® M689, being a MDI-based prepolymer with a NCO-group content of 15 wt.-%. Lupranat® M20R is a commercially available hardener (polymeric MDI) with a NCO-group content of 31.5 wt.-%. Lupranat® M70R is also a commercially available hardener (polymeric MDI) with a NCO-group content of 31.5 wt.-%.

100 parts by weight of component (A) have been mixed with 33 parts by weight of component (B) in case of example 6. In case of comparative example 3 the mixing ratio by weight of (A) to (B) was 100:66. In case of comparative example 4 the mixing ratio by weight of (A) to (B) was 100:53. In case of each of comparative examples 5 and 6 the mixing ratio by weight of (A) to (B) was 100:25.

Each of the resulting coating composition obtained from components (A) and (B) was then manually applied onto a substrate at 23° C. The substrate as outlined in item 2. was used.

TABLE 4

|  | Example 6 | Comparative example 3 | Comparative example 4 | Comparative example 5 | Comparative example 6 |
|---|---|---|---|---|---|
|  | Component (A) | Component (A) | Component (A) | Component (A) | Component (A) |
| Versalink ® P-1000 | 75.20 | 74.20 | 74.20 | 74.20 | 74.20 |
| Diisopropyl napthalene (isomeric mixture) | 15.50 | 15.50 | 15.50 | 15.50 | 15.50 |
| Reactive diluent | 5.50 | 5.50 | 5.50 | 5.50 | 5.50 |
| UV absorber I | 1.00 | 1.00 | 1.00 | 1.00 | 1.00 |
| UV absorber II | 0.30 | 0.30 | 0.30 | 0.30 | 0.30 |
| Defoamer I | 1.50 | 1.50 | 1.50 | 1.50 | 1.50 |
| Silquest ® A 187 | 1.00 | 1.00 | 1.00 | 1.00 | 1.00 |
| Rhelogical additive I | 1.00 | 1.00 | 1.00 | 1.00 | 1.00 |
| Σ | 100.00 | 100.00 | 100.00 | 100.00 | 100.00 |
|  | Component (B) | Component (B) | Component (B) | Component (B) | Component (B) |
| SUPRASEC ® 2029 | 100.00 | — | — | — | — |
| Masterseal ® M800 PTB | — | 100.00 | — | — | — |
| Masterseal ® M689 PTB | — | — | 100.00 | — | — |
| Lupranat ® M20R | — | — | — | 100.00 | — |
| Lupranat ® M70R | — | — | — | — | 100.00 |

4.2 Properties of the coatings obtained from example 6 and comparative examples 3 to 6 as well as of the compositions as such have been investigated. It can be seen from Table 5 that comparative examples 3 to 6 in particular lead to an only insufficient tensile strength compared to inventive example 6. In addition, inventive example 6 leads to a shorter gel time, which is advantageous. Gel time is defined as the time it takes until the viscosity of the composition obtained after mixing components (A) and (B) reaches a value of 15000 mPas at room temperature (23° C.), wherein the viscosity is measured according to the method disclosed in the 'methods' section.

TABLE 5

|  | Example 6 | Comparative example 3 | Comparative example 4 | Comparative example 5 | Comparative example 6 |
|---|---|---|---|---|---|
| Elongation [%] | 303 | 247 | 218 | 79 | 83 |
| Tensile strength [MPa] | 22 | 2.3 | 2.7 | 4.1 | 5.4 |
| Gel time [min] | 19 | 87 | 62 | 26 | 26 |

The invention claimed is:

1. A method of sealing a surface of a substrate, comprising at least step (1), (1) applying a coating composition onto the surface of a substrate, wherein the coating composition is obtainable by mixing components (A) and (B) of a coating system with each other, said coating system being a two-component (2K) coating system consisting of two components (A) and (B) being separate from each other, wherein component (A) comprises at least one constituent (a1) containing at least two aromatic moieties and bearing at least two primary and/or secondary amino groups, wherein at least one of the primary and/or secondary amino groups is directly bound to each of the at least two aromatic moieties, and wherein the amount of any fillers present in component (A) does not exceed 5 wt.-%, based on the total weight of component (A), wherein constituent (a1) is present in component (A) in an amount in the range of from of 50 to 95 wt.-% based on the total weight of component (A), wherein component (B) comprises at least one constituent (b1) containing at least one aromatic moiety and bearing at least two isocyanate groups, wherein each of components (A) and (B) has a solid content of at least 95 wt.-%, based on the total weight of the respective component, characterized in that constituent (b1) present in component (B) bears at least one carbodiimide and/or uretonimine unit and further comprises at least one structural unit (I):

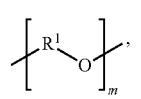

(I)

wherein $R^1$ is a $C_2$ to $C_8$ alkylene residue, and parameter m is an integer in the range of from 1 to 200;

wherein for preparing the constituent (b1) at least one aromatic diisocyanate is subjected to a reaction with at least one polyether diol; and characterized in that constituent (a1) further comprises at least one structural unit (II):

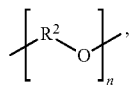

wherein $R^2$ is a $C_2$ to $C_8$ alkylene residue, and parameter n is an integer in the range of from 1 to 100.

2. The method according to claim 1, characterized in that constituent (b1) is the only isocyanate-group containing constituent present in component (B).

3. The method according to claim 1, characterized in that constituent (b1) is obtainable by subjecting at least one prepolymer of an aromatic diisocyanate, bearing at least two isocyanate groups, wherein the prepolymer has been prepared by reaction of a polyether polyol with at least one aromatic diisocyanate and/or a polymer thereof, to a decarboxylation condensation reaction under formation of at least one carbodiimide and/or uretonimine unit.

4. The method according to claim 1, characterized in that an NCO content present in constituent (b1) is in the range of from 20 to 35 wt.-%, based on the total weight of constituent (b1).

5. The method according to claim 1, characterized in that the solids content of component (A) is >98 wt.-%, based on the total weight of component (A), and in that the solids content of component (B) is >98 wt.-%, based on the total weight of component (B).

6. The method according to claim 1, characterized in that the coating composition is sprayable.

7. The method according to claim 1, characterized in that the coating composition is obtainable by mixing components (A) and (B) in a weight ratio (component (A)/component (B)) in the range of from 5:1 to 1:2.

8. The method according to claim 1, characterized in that the mixing of components (A) and (B) of the coating system in order to prepare the coating composition is performed in a high-pressure device with countercurrent injection technology by making use of an impingement mixing principle.

9. A sealed substrate obtainable by the method according to claim 1.

10. A method of using a coating composition as defined in claim 1 obtainable by mixing components (A) and (B) of a coating system as sealant, the method comprising using the coating composition for providing a barrier coating on a substrate.

11. A coating composition obtainable by mixing components (A) and (B) of a coating system with each other, wherein component (A) comprises at least one constituent (a1) containing at least two aromatic moieties and bearing at least two primary and/or secondary amino groups, wherein at least one of the primary and/or secondary amino groups is directly bound to each of the at least two aromatic moieties, and wherein the amount of any fillers present in component (A) does not exceed 5 wt.-%, based on the total weight of component (A), wherein constituent (a1) is present in component (A) in an amount in the range of from of 50 to 95 wt.-% based on the total weight of component (A), wherein component (B) comprises at least one constituent (b1) containing at least one aromatic moiety and bearing at least two isocyanate groups, wherein each of components (A) and (B) has a solid content of at least 95 wt.-%, based on the total weight of the respective component, characterized in that constituent (b1) present in component (B) bears at least one carbodiimide and/or uretonimine unit and further comprises at least one structural unit (I):

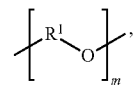

wherein $R^1$ is a $C_2$ to $C_8$ alkylene residue, and parameter m is an integer in the range of from 1 to 200;

wherein for preparing the constituent (b1) at least one aromatic diisocyanate is subjected to a reaction with at least one polyether diol; and characterized in that constituent (a1) further comprises at least one structural unit (II):

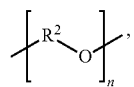

wherein $R^2$ is a $C_2$ to $C_8$ alkylene residue, and parameter n is an integer in the range of from 1 to 100.

12. A two-component (2K) coating system consisting of two components (A) and (B) being separate from each other, wherein component (A) comprises at least one constituent (a1) containing at least two aromatic moieties and bearing at least two primary and/or secondary amino groups, wherein at least one of the primary and/or secondary amino groups is directly bound to each of the at least two aromatic moieties, and wherein the amount of any fillers present in component (A) does not exceed 5 wt.-%, based on the total weight of component (A), wherein constituent (a1) is present in component (A) in an amount in the range of from of 50 to 95 wt.-% based on the total weight of component (A), wherein component (B) comprises at least one constituent (b1) containing at least one aromatic moiety and bearing at least two isocyanate groups, wherein each of components (A) and (B) has a solid content of at least 95 wt.-%, based on the total weight of the respective component, characterized in that constituent (b1) present in component (B) bears at least one carbodiimide and/or uretonimine unit and further comprises at least one structural unit (I):

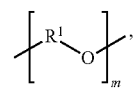

wherein $R^1$ is a $C_2$ to $C_8$ alkylene residue, and parameter m is an integer in the range of from 1 to 200;

wherein for preparing the constituent (b1) at least one aromatic diisocyanate is subjected to a reaction with at least one polyether diol; and characterized in that constituent (a1) further comprises at least one structural unit (II):

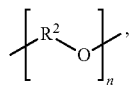
(II)

wherein $R^2$ is a $C_2$ to $C_8$ alkylene residue, and parameter n is an integer in the range of from 1 to 100.

13. The method according to claim 1, characterized in that the surface is a pre-coated surface.

14. The method according to claim 1, characterized in that the substrate is an exterior of a fuel tank.

15. The method according to claim 1, characterized in that the substrate is an exterior of an aircraft fuel tank.

16. The method according to claim 1, characterized in that constituent (a1) further comprises at least one structural unit (II):

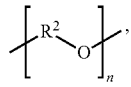
(II)

wherein $R^2$ is a $C_2$ to $C_6$ alkylene residue, and parameter n is an integer in the range of from 1 to 40.

17. The method according to claim 1, characterized in that constituent (a1) further comprises at least one structural unit (II):

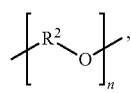
(II)

wherein $R^2$ is a $C_2$ to $C_4$ alkylene residue, and parameter n is an integer in the range of from 1 to 10.

18. The method according to claim 1, wherein when component (A) comprises constituents bearing OH-groups, said OH-groups are present in amounts significantly lower than of the amino groups of constituent (a1).

19. The method according to claim 1, wherein component (A) does not comprise any OH-functional polyesters.

20. The method according to claim 1, wherein component (A) does not comprise any constituent bearing one or more OH-groups.

* * * * *